(12) United States Patent
Shah et al.

(10) Patent No.: US 10,567,949 B2
(45) Date of Patent: Feb. 18, 2020

(54) MMS TERMINATION ON DIFFERENT NETWORKS

(71) Applicant: T-Mobile U.S.A., Inc., Bellevue, WA (US)

(72) Inventors: Mehul Shah, Bellevue, WA (US); Chingming Chao, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 47 days.

(21) Appl. No.: 14/801,666

(22) Filed: Jul. 16, 2015

(65) Prior Publication Data
US 2017/0019779 A1 Jan. 19, 2017

(51) Int. Cl.
*H04W 4/12* (2009.01)
*H04W 8/04* (2009.01)
*H04W 8/06* (2009.01)

(52) U.S. Cl.
CPC .............. *H04W 8/04* (2013.01); *H04W 4/12* (2013.01); *H04W 8/06* (2013.01)

(58) Field of Classification Search
CPC ........... H04W 8/04; H04W 8/12; H04W 4/12; H04W 8/06
USPC ............. 455/461, 432.1, 432.2, 432.3, 412.1
See application file for complete search history.

(56) References Cited

U.S. PATENT DOCUMENTS

| | | | | |
|---|---|---|---|---|
| 7,260,195 B1 * | 8/2007 | Elman | .................. | H04M 15/00 379/114.03 |
| 7,680,491 B2 * | 3/2010 | Zabawskyj | ......... | H04W 76/025 455/415 |
| 7,974,988 B2 | 7/2011 | Nandiwada et al. | | |
| 8,175,622 B2 * | 5/2012 | Jiang | ....................... | H04W 8/04 455/412.1 |
| 8,321,441 B2 * | 11/2012 | Dettinger | .......... | G06F 17/30398 707/759 |
| 8,417,270 B2 | 4/2013 | Zhang et al. | | |

(Continued)

FOREIGN PATENT DOCUMENTS

| | | |
|---|---|---|
| EP | 1835768 A1 | 9/2007 |
| WO | 2013055054 A1 | 4/2013 |
| WO | 2014090997 A1 | 6/2014 |

OTHER PUBLICATIONS

Syniverse Technologies, LLC. "Syniverse Sponsored Roaming for GSM." <www.syniverse.com/files/service_solutions/pdf/sponsored_roaming_for_gsm> Dec. 2014, 2 pages.

(Continued)

*Primary Examiner* — Lester G Kincaid
*Assistant Examiner* — Dung L Lam (57) ABSTRACT

A mobile device, via a roaming platform, can switch IMSIs (e.g., Home IMSI-1, Roamer IMSI-2, etc.) depending on a location of the mobile device. Upon switching IMSIs, the roaming platform can forward the update location to an HLR of the home network and roaming network. If the MMSC on the home network receives an MMS message, the MMSC on the home network may query the HLR for a current location. From the query, if the message recipient is roaming, the MMSC on the home network may communicate with the MMSC on the roaming network to deliver the message. As a result, the roaming network can handle the routing of the message without a data session routed back through the home network.

20 Claims, 6 Drawing Sheets

(56) References Cited

U.S. PATENT DOCUMENTS

| | | | |
|---|---|---|---|
| 8,422,657 B1* | 4/2013 | Chartrand | H04M 3/42306 |
| | | | 379/142.1 |
| 8,693,358 B2 | 4/2014 | Hodges | |
| 8,725,140 B2* | 5/2014 | Mohammed | H04L 63/0428 |
| | | | 455/411 |
| 9,143,534 B1* | 9/2015 | Kelliher | H04L 51/10 |
| 2002/0197991 A1* | 12/2002 | Anvekar | H04W 8/183 |
| | | | 455/432.1 |
| 2003/0139182 A1* | 7/2003 | Bakkeby | H04W 8/06 |
| | | | 455/432.1 |
| 2005/0070278 A1* | 3/2005 | Jiang | H04W 8/183 |
| | | | 455/432.3 |
| 2005/0136915 A1 | 6/2005 | Rooke et al. | |
| 2007/0213050 A1* | 9/2007 | Jiang | H04W 8/04 |
| | | | 455/432.3 |
| 2007/0254648 A1 | 11/2007 | Zhang et al. | |
| 2007/0275739 A1* | 11/2007 | Blackburn | H04L 12/585 |
| | | | 455/466 |
| 2008/0002609 A1 | 1/2008 | Caldwell et al. | |
| 2008/0207181 A1 | 8/2008 | Jiang et al. | |
| 2009/0209234 A1 | 8/2009 | Bright et al. | |
| 2010/0208648 A1 | 8/2010 | Narkar et al. | |
| 2011/0294472 A1* | 12/2011 | Bramwell | H04W 8/04 |
| | | | 455/413 |
| 2013/0183933 A1 | 7/2013 | Kumar et al. | |
| 2013/0212301 A1* | 8/2013 | Bischinger | H04W 8/26 |
| | | | 709/245 |
| 2015/0327030 A1* | 11/2015 | Bendi | H04W 4/12 |
| | | | 455/466 |

OTHER PUBLICATIONS

Now Wireless Limited. "How MMS Works—Now SMS." <www.nowsms.com/faq/how-mms-works> accessed Apr. 28, 2015, 5 pages.

Ozeki SMS wiki Your Ultimate Guide for Mobile Messaging. "MMSC Reference Architecture." <www.sms-wiki.org/p_115-mmsc-sms.html> accessed Apr. 28, 2015, 2 pages.

Bluefish Technologies Making it possible. "Applications & Solutions." <www.bluefish.com/dual-multi-imsi,221.html> 2014, 1 page.

Synectiv Ltd. "MVNO Solutions." <www.synectiv.com/IMSI.aspx> 2015, 2 pages.

International Searching Authority, International Search Report and Written Opinion, PCT Patent Application PCT/2016/042662, dated Oct. 26, 2016, 17 pages.

European Patent Office, Extended European Search Report, EP Patent Application 16825289.8, dated Nov. 7, 2018, 11 pages.

* cited by examiner

MMS TERMINATION ON DIFFERENT NETWORKS

BACKGROUND

Mobile network operators (MNOs) and mobile virtual network operators (MVNOs) provide wireless communications services to mobile devices. An MNO (e.g., a wireless carrier, cellular company, or mobile network carrier) operates throughout the world and has territories, networks, systems, and business units. MVNOs are similar to MNOs, but MVNOs do not own the wireless network infrastructure. In order to provide mobile device users with that infrastructure, MVNOs enter into business agreements with one or more MNOs to obtain access to network infrastructure. For example, an MVNO may use its own customer service, billing support systems, and marketing and sales personnel, but pay an MNO for access to the MNO's network infrastructure on a per-minute basis (usually at a discounted rate).

Generally, an MNO (or MVNO via a business agreement) provides the "home" or "primary" communications network to mobile device users. When users travel outside of their home network, however, users are "roamers" or considered to be "roaming outside of their home network." When a user is roaming, the user's mobile device may connect to one of many different local M(V)NOs, which provide a "roaming" or "secondary" network. In other words, roaming is the ability of customers to use their mobile devices outside the geographical coverage area provided by their home network operator (e.g., MVNO or MNO).

MVNOs are growing in popularity. For example, there are more than 1,000 MVNOs globally, many of which were started within the last few years. Also, the MVNO market is predicted to reach 270 million customers by 2017, a 50% increase compared to the previous two years. Furthermore, in the growing MVNO wireless communications market, MVNOs increasingly want to differentiate services to attract new customers. One such way to differentiate services is to provide more global coverage for mobile device users. For example, an MVNO can use multiple business agreements with several MNOs to "stitch" the roaming footprints of these MNOs into a large coverage area for the mobile device user.

However, there are several problems associated with MVNOs providing increased global service via one MNO or a network of MNOs. For example, there are several challenges to providing and terminating messaging services when customers using mobile devices are roaming (i.e., not on the home network). The industry needs systems and methods that overcome these and related problems and provide additional benefits. Other limitations of existing or prior systems will become apparent to those of skill in the art upon reading the following Detailed Description.

BRIEF DESCRIPTION OF THE DRAWINGS

Embodiments of the disclosed technology will be described and explained through the use of the accompanying drawings.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Various embodiments of the disclosed technology generally relate to multimedia messaging services (MMS). Also, some embodiments provide systems and methods for terminating MMS from a home network to a roaming network. Historically, when a mobile device was roaming, the data session for MMS was handled on the home network and anchored in the home network. As a result, the home network had control of the data session and all data was routed back through the home network. However, routing all the data back through the home network leads to additional costs and processing on the home network.

In contrast, various embodiments of the disclosed technology terminate MMS at a roaming mobile device by locally breaking out the data session and anchoring the data session in the roaming network. For example, if a mobile device on a home network (e.g., MVNO) sends a multimedia message (MMS message) to a recipient mobile device on a roaming network, some embodiments of the system will receive the MMS message in the home network, determine whether the receiving mobile device is currently located on a roaming network, and send the MMS message to a Multimedia Messaging Service Center (MMSC) on the roaming network. Then, the roaming network locally breaks out the data session to send the MMS message to the mobile device on the roaming network. Locally breaking out the data session and anchoring the data session in the roaming network allows the local infrastructure to handle the delivery of the MMS message without further involvement from the home network. Specifically, the Gateway GPRS Support Node (GGSN) and the Serving GPRS Support Node (SGSN) handle the data session for MMS while the mobile device is roaming and the serving MMSC and the serving SMSC are involved in the delivery of the MMS to the terminating roaming device.

Furthermore, in some embodiments, the system for terminating MMS may include various network architecture and methods for terminating MMS on a mobile device having multiple International Mobile Subscriber Identities (IMSIs) (e.g., home IMSI-1 and roamer IMSI-2) using a roaming platform. For example, the roaming platform in combination with the mobile device can be used to select an IMSI for the current roaming network and communicate to a Home Local Register (HLR) on the home network. In some embodiments, the roaming platform may be a multi-international mobile subscriber identity (multi-IMSI) platform (e.g., a modified version of the Syniverse Sponsored Roaming Platform (SRP) that identifies which roaming network is being used and communicates that information to an HLR on the home network. In some embodiments, the roaming platform may use IMSI-1 (e.g., IMSI home) when communicating with a home network, and use IMSI-2 (e.g., IMSI roaming) when communicating with a roaming network. In some embodiments, the mobile device may have a Subscriber Identity Module (SIM) with two or more IMSIs.

In some embodiments, the roaming platform may have the ability to embed logical information (e.g., address digits, additional address fields, etc.) in communications between the home and roaming network. For example, the roaming platform may modify E.164 communication between a roaming and home network. In such an example, when communicating with a home network, the roaming platform may add a prefix to the E.164 address of a roaming mobile device. Also, in such an example, when the roaming platform is communicating with roaming network, the roaming platform may remove the prefix. In some embodiments, the prefix may indicate logical location information that may identify the roaming network being used by the mobile device. The prefix, in some embodiments, can be digits, single or multiple, and contain additional information (e.g., the MSISDN header for a mobile device). Also, the roaming platform may be capable of changing communication protocols when communicating between the home network and roaming network (e.g., switching from E.214 to E.212).

In various embodiments, the system may include an HLR to modify one or more existing database entries to include the location information (e.g., additional address digits) of the roaming mobile device. For example, when a roaming platform sends a location update to an HLR, the HLR modifies an entry to include the location information (e.g., address digits that indicate the mobile device is roaming on a specific network).

The network architecture can also include a Multimedia Messaging Service Center (MMSC) capable of querying a database the HLR to determine if a recipient of an MMS message is roaming and where that recipient is roaming based on the address information (e.g., logical address data or address digits). Also, the MMSC may include a database which can be used to determine if the requested recipient of an MMS message is an MVNO subscriber, if the recipient's mobile device is roaming, or if the recipient is blacklisted from using MMS while roaming.

In some embodiments, if an MMSC receives an MMS message intended for a mobile device recipient located in the roaming network, the MMSC on the home network can query the home HLR via a modified (e.g., custom) MM5 interface (the interface between MMSC and HLR) to determine if this subscriber is roaming. If the subscriber is roaming on a specific visiting location register (VLR), the disclosed system can send a message (e.g., MM7) to the serving MMSC on the roaming network, and deliver the message from the home network to the roaming network. Then, the serving MMSC orchestrates the data messaging session, which is locally broken out on the roaming network.

There are several advantages to various embodiments of the disclosed systems and methods. For example, some embodiments of the roaming network can handle the routing of the message without a data session routed back through the home network. Moreover, the data session for the mobile device user is locally broken out in the roaming network. Locally broken out data sessions allow the serving MMSC on the roaming network and serving SMSC on the roaming network to handle the data session for delivery of MMS messages. For example, once the serving MMSC on the roaming network receives the MMS message from the MMSC on the home network, the serving MMSC on the roaming network can deliver the MMS message to the intended recipient without communication with the home network. Also, some embodiments allow a mobile device to be anchored on the local packet gateway, which is selected depending on the active IMSI at that given time.

An example of another advantage of some embodiments is that MNOs and MVNOs, via the roaming agreements, are able to monitor the quality of message service for roamers on other networks and receive confirmation on a home network that an MMS message was locally delivered to a mobile device in the roaming network. Additionally, because customers are increasingly interested in global coverage and seamless messaging services while roaming, M(V)NOs can implement this system to attract new customers and increase profitability. Also, while new infrastructure (e.g., a modified HLR and MMSC) may be used to implement the MMS terminating method, existing HLRs and MMSCs can be modified to incorporate changes to allow for MMS termination from a home network to a roaming network.

Some embodiments of the disclosed technology may provide MAP layer awareness of subscriber activity. For example, an HLR has control over roaming subscriber activity, and the HLR can be configured to disallow (e.g., blacklist) roaming in networks where a customer is roaming (assuming there is a bilateral agreement in place). Furthermore, their VLRs will not need to maintain subscriber entry information; rather, a roaming platform will update the VLR with this information.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Moreover, while many embodiments discussed in this disclosure use a dual-IMSI solution as an example, one with ordinary skill in the art will understand that these embodiments and examples can extend to multi-IMSI solutions (i.e., more than two networks and more than two IMSIs).

Also, the techniques introduced in this disclosure can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Illustrative Environment

Figure 1:
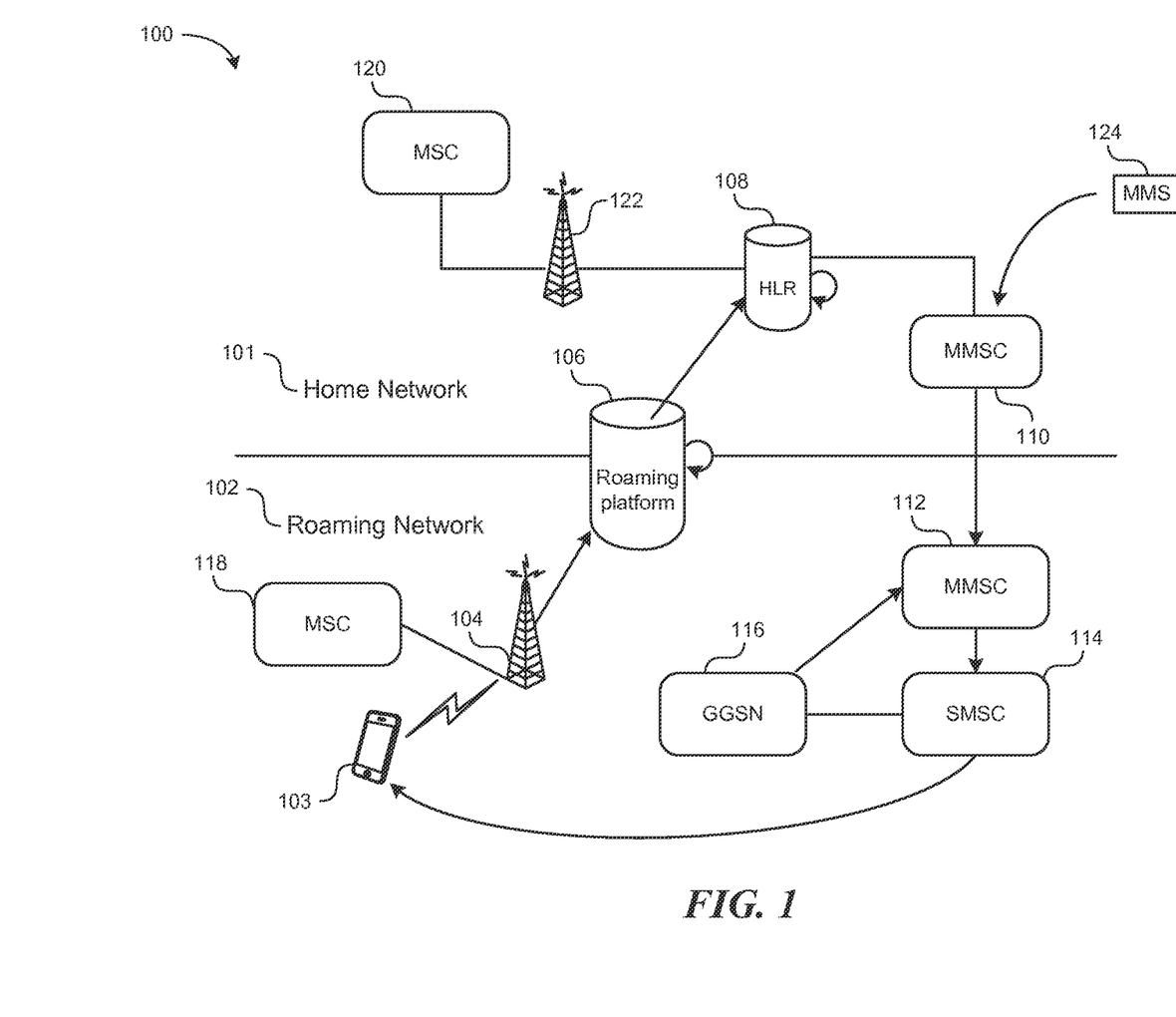
FIG. 1 illustrates a block diagram of a communications environment in which some embodiments of the disclosed technology for terminating multimedia message service (MMS) may be utilized.

FIG. 1 is a block diagram illustrating an example of communications environment 100 in which MMS can be terminated to a mobile device in a roaming network. In communications environment 100 illustrated in FIG. 1, one or more communications networks such as home network 101 and roaming network 102 are shown, and customers may use mobile device 103 (e.g., a cell phone, smartphone, or advanced mobile device) to connect to home and roaming networks 101 and 102.

Communications environment 100 includes base transceiver stations (BTS) 104 and 122 (e.g., as shown in FIG. 1, BTS 104 is for roaming network 102, and BTS 122 is for home network 101), roaming platform 106, Home Local Register (HLR) 108, Multimedia Messaging Service Centers (MMSC) 110 and 112 (e.g., as shown in FIG. 1, MMSC 110 is in home network 101, and MMSC 112 is in roaming network 102), Short Message Service Centers (SMSC) 114, Gateway General Packet Radio Service (GPRS) support nodes (GGSN) 116, visited mobile switching center (MSC) 118 and MSC 120 (e.g., as shown in FIG. 1, MSC 118 is for roaming network 102, and MSC 120 is for home network 101), and an incoming multimedia message (MMS message) 124. All of these components can communicate directly or indirectly via home network 101, roaming network 102, and roaming platform 106. Although only one component is shown (e.g., one GGSN), one with ordinary skill in the art will appreciate that there can be several components and that those components can be located in the home 101 or roaming 102 networks. For example, home network 101 may have a GGSN and SMSC (not shown).

Home network 101 and roaming network 102 may be comprised of a combination of networks including Public Switched Telephone Networks (PSTNs), interconnected via gateways operable to facilitate communications between and among various networks. Also, home network 101 and roaming network 102 can include a GSM mobile communications network, a code/time division multiple access (CDMA/TDMA) mobile communications network, a $3^{rd}$, $4^{th}$ or $5^{th}$ generation (3G/4G/5G) mobile communications network (e.g., General Packet Radio Service or Enhanced General Packet Radio Service (GPRS/EGPRS)), Enhanced Data rates for GSM Evolution (EDGE), Universal Mobile Telecommunications System (UMTS), or Long Term Evolution (LTE) network, or other communications network, Personal Communications Service (PCS), Digital Advanced Mobile Phone Service (D-Amps), Bluetooth, Wi-Fi, or Fixed Wireless Data. These networks may use protocols such as TCP/IP, UDP, RTSP, extensible messaging and presence protocol (XMPP), real time messaging protocol (RTMP), instant messaging and presence protocol (IMPP), instant messaging, USSD, IRC, or any other wireless data networks or messaging protocols. Home network 101 and roaming network 102 (and components of these networks) may also include wired communication and wired networks. Also, one with ordinary skill in the art will understand that there may be several roaming networks, all of which may connect to roaming platform 106.

As shown in FIG. 1, communications environment 100 may include base transceiver stations (BTS) 104 and/or 122, each of which is a piece of equipment that facilitates wireless communication between a mobile device user and a network (e.g., home network 101 or roaming network 102). Roaming platform 106 may be a combination of hardware and software components (e.g., a modified version of the SYNIVERSE dual-IMSI solution). The hardware can include one or more computing devices with processors, memory, communication devices, and databases that can interact with home network 101 and roaming network 102 and the components of each network. Also, one with ordinary skill in the art will appreciate that roaming platform 106 can be used for several networks, each being identified by an IMSI of a mobile device.

Assuming a roaming agreement exists between two networks, roaming platform 106 can allow the mobile device to switch IMSIs depending on the current location of the mobile device. For example, the dual-IMSI solution may have a home IMSI that belongs to particular MNO that is the home network for the mobile device user. When mobile device 103 is active on roaming network 102, mobile device 103 may activate IMSI-2 and notify roaming platform 106 that IMSI-2 is currently in use (and/or that mobile device 103 is located on roaming network 102). Similarly, if mobile device 103 moves back to home network 101, mobile device 103 can activate IMSI-1 and notify roaming platform 106.

Roaming platform 106 may be capable of updating the location of a roaming mobile device with both the home network 101 and roaming network 102. The location can refer to the network in which the mobile device is located or it can refer to which MMSC is able to directly connect with the mobile device. The location can be a logical location (e.g., a numerical address or digits). Also, the MNO owner or MVNO owner may modify roaming platform 106 to have a different fixed value or a fixed value that indicates certain information (e.g., a combination of letters and numbers and other logical identifiers). For example, roaming platform 106 could send a fixed value (e.g., 15622751140) in Message Application Part (MAP) layer in a send-routing-information for short message SRI_SM response message to an MMSC or HLR (e.g., via MMSC 110) when a subscriber is roaming. Roaming platform 106 can then send the location update information to HLR 108 in the home network, which will update an HLR 108 entry to reflect the location update.

Roaming platform 106 may implement features required for fully functional dual-IMSI or multi-IMSI roaming service delivery. For example, roaming platform 106 may provide processing of location management, subscriber management, authentication management and call handling MAP. In some embodiments roaming platform 106 may also process customized applications for mobile networks enhanced logic traffic (CAMEL), SMS and unstructured supplementary service data (USSD) transactions, signaling connection control part (SCCP) protocol, Global Titles (GT) subsystems, global titles translation (GTT) functionality, mobile station roaming number (MSRN) modification for inbound roamers, IMSI modification for outbound roamers, CAP (CAMEL) parameters modification for outbound roamers, and other standard interfaces and protocols.

HLR 108 may be a database containing data regarding customers (e.g., subscribers) authorized to use a network (e.g., home network 101). In some embodiments, when a new subscriber is added to the system, the network provider (e.g., MNO) can enter the subscriber's information into HLR 108. MSC 120 can access HLR 108, and home network 101 may contain more than one HLR (not shown). Some of the information stored in an HLR 108 includes the International Mobile Subscriber Identity (IMSI) and the Mobile Station International Subscriber Directory Number (MSISDN) of each subscriber (e.g., MNO or MVNO customer). HLR 108 can use IMSIs to identify each subscriber, and IMSIs serve as a key for each HLR 108 record. Other information stored in HLR 108 can include services requested by or rendered to the corresponding subscriber, the GPRS settings of the subscriber, the current location of the subscriber and call divert settings.

HLR 108 may be capable of modifying entries to include (or accepting modified entries that include) logical location address data. For example, roaming platform 106 may send a fixed value (e.g., 15622751140) in Message Application Part (MAP) layer in an SRI_SM response message to an MMSC that communicates the logical location address of mobile device 103 to HLR 108. HLR 108 can modify an entry associated with incoming IMSI to include at least part of this fixed value (e.g., 15622751140), and from this entry HLR 108 can identify whether the user is roaming and where the user is roaming. Also, while not shown in FIG. 1, HLR 108 may communicate with a call detail record (CDR) generating entity (e.g., an MSC). CDR entries may be modified to include logical location address digits. In some embodiments, additional CDR field address digits can be added to include a node response SRI_SM message. Additionally, SCAP AVP field address digits including from the SRI_SM message shall be added to support the disclosed technology.

Included in communications environment 100 is at least one MMSC. MMSC is responsible for handling transactions from MMS mobile devices and transactions from other messaging systems (e.g., other MMS systems, email systems, etc.). MMSC can store messages that are awaiting retrieval from devices (e.g., mobile device on a roaming network). MMSC can provide various service capacities: point-to-point, point-to-application, application-to-point, point-to-multipoint, and application-to-multipoint. Also, MMSCs may store and utilize $3^{rd}$ Generation Partnership Project (3GPP) standards. The standards consist of a number of interfaces between components found in the mobile network (e.g., MM1 for client to MMSC, MM4 for MMSC to MMSC, and MM7 for MMSC to value-added service applications). As shown in FIG. 1, MMSC 110 or 112 may be located on home and roaming networks 101 and 102, respectively. MMSC 110 and MMSC 112 may communicate via the MM4 interface.

MMSC 110 and MMSC 112 can include software modules to perform various operations and may also include lookup tables and databases. For example, MMSC 110 and MMSC 112 may use one or more software modules to perform operations to look up MSISNs, operator IDs, subscriber location information with Local Mobile State Identity (LMSI) address digits, and message IDs for message recipients.

MMSC 110 and MMSC 112 can include a modified, custom MM5 interface. In some embodiments, MMSC 110 and MMSC 112 can store protocols and software modules to trace and look up information about MMS message recipients. MMSC 110 and MMSC 112 can perform lookup operations based on these parameters. For example, MMSC 110 can also perform a "send-routing-information for short message" (SRI_SM) query to HLR 108 using the modified MM5 interface, which allows MMSC 110 to determine the logical address of a roaming mobile device from the HLR 108 entry. The logical address (e.g., a prefix or addition of digits in the HLR entry), which is received from the roaming platform 106, can be used to indicate where the mobile device/subscriber is roaming. In some embodiments, an administrator can modify MMSC 110 to disable or enable MMSC 110 from searching for this information.

GGSN 116 can be responsible for the communication between the GPRS network and external packet switched networks, for example, for interworking Internet Protocol (IP) protocols. In some embodiments, GGSN 116 is a router to a sub-network, because GGSN 116 "hides" the GPRS infrastructure from the external network. When GGSN 116 receives data addressed to a specific user, GGSN 116 may determine if the user is active. If the user is active, GGSN 116 can forward data to the Service GPRS Support Node (SGSN, not shown in FIG. 1) serving the mobile user; but if the mobile user is inactive, the data is discarded.

As shown in FIG. 1, communications environment 100 can include a short message service center (SMSC) 114, which is a network element in the mobile telephone network. Each mobile phone network can have one or more SMSCs. SMSCs store, forward, convert and deliver SMS messages. Also, SMSCs can be used in the process of delivering MMS messages, because SMSCs can send notifications to mobile devices on the network that MMSC is storing a message intended for the mobile device. In other words, MMSC and SMSC can work together to deliver MMS messages, but MMSC may be responsible for the content of the message.

Communications environment 100 may receive MMS messages at MMSC 110. MMSC 110 can send these messages to MMSC 112. Also, while not shown, MMSC 112 may receive MMS messages on the roaming network. MMS messages may include a picture, a video (e.g., with sound), audio file, short text message, voice memo, street address, a vCard, and group messages.

MSC 118 and MSC 120 may switch data packets from one network path to another (e.g., routing). For example, MSC 118 may be used to access the public switched telephone networks (PTSNs) to route messages or incoming calls to mobile device 103. MSCs 118 and 120 may also provide information that is needed to support mobile service subscribers, such as registration and authentication. As shown in FIG. 1, MSC 118 may handle the voice traffic for roaming network 102 and MSC 120 may handle the voice traffic for home network 101. Depending on the MNO, MSC 118 may be connected to a visited local register (VLR, discussed in FIG. 2), and MSC 118 may communicate with a VLR. MSC 118 and MSC 120 may support a wide range of protocols including: RANAP, BSSAP, N-ISUP, SIGTRAN, BICC, MAP, CAP, INAP, SIP, and GCP. One with ordinary skill in the art will appreciate that MSC 118 and MSC 120 can support other protocols and standards used in wireless networks. Also, one with ordinary skill in the art will appreciate that while MSC 118 and MSC 120 are shown in FIG. 1, there can be several MSCs and these MSC 118 and MSC 120 (and additional MSCs) can communicate with components of home network 101 or roaming network 102.

Figure 2:
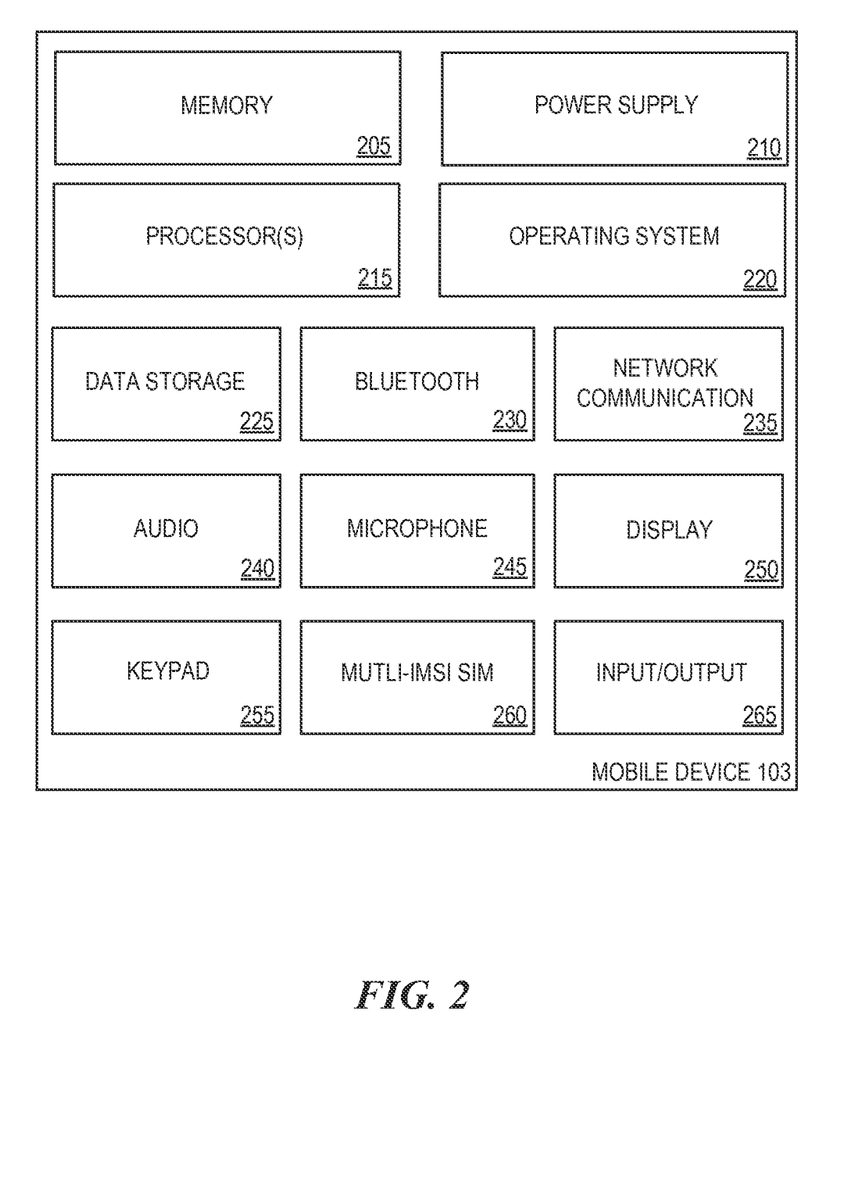
FIG. 2 illustrates a set of components within a mobile device according to one or more embodiments of the disclosed technology.

FIG. 2 illustrates a set of components within a mobile device according to one or more embodiments of the disclosed technology. As shown in FIG. 2, mobile device 103 may include memory 205 (e.g., volatile memory and/or nonvolatile memory), power supply 210 (e.g., battery), processor(s) 215 for executing processing instructions, and operating system 220. Additional components include components such as data storage component 225 (e.g., hard drive, flash memory, memory card, etc.), one or more network interfaces (e.g., Bluetooth Interface 230; and Network Communication Interface 235, which enables the mobile phone to communicate by transmitting and receiving wireless signals using licensed, semi-licensed or unlicensed spectrum over a telecommunications network), audio interface 240, microphone 245, display 250, keypad or keyboard 255, MULTI-IMSI SIM 260, and other input and/or output interfaces 265. The various components of a mobile device may be interconnected via a bus.

Processor(s) 215 are the main processors of mobile device 103 and may include application processors, baseband processors, various co-processors, and other dedicated processors for operating mobile device 103. For example, an application processor can provide the processing power to support software applications, memory management, graphics processing, and multimedia. An application processor may be communicably coupled with memory 205 and configured to run the operating system, the user interface, and the applications stored on memory 205 or data storage component 225. A baseband processor may be configured to perform signal processing and implement/manage real-time radio transmission operations of mobile device 103. These processors along with the other components may be powered by power supply 210. The volatile and nonvolatile memories found in various embodiments may include storage media for storing information, such as processor-readable instructions, data structures, program modules, or other data. Some examples of information that may be stored include basic input/output systems (BIOS), operating systems, and applications.

Mobile device 103 may include a Subscriber Identity Module (SIM) card that stores one or more International Mobile Subscriber Identities (IMSI) that can be used to identify the mobile device on a Global System for Mobile (GSM) network or other network (e.g., those employing 3G and/or 4G wireless protocols), and MULTI-IMSI SIM 260. Mobile device 103 can include a Mobile Station International Subscriber Directory Number (MSISDN) uniquely identifying a mobile device in a GSM or a Universal Mobile Telecommunications System (UMTS) mobile network. In some embodiments roaming platform 106 can generate or modify entries in HLR 108 that include location information of the mobile device based on the current IMSI in use by the mobile device. This allows a mobile device user to have a single MSISDN that others can use to reach the mobile device user even though the user is roaming. Also, the IMSI is usually composed of the mobile country code (MCC), mobile network code (MNC), and the mobile subscriber identification number (MSIN). These portions of the IMSI may be used in some embodiments of roaming platform 106 to identify the roaming network and generate the request to update HLR 108. The SIM is the physical device inside a mobile device that contains a record of the IMSI. SIMs are usually issued by the network operator (e.g., MNO or MVNO).

Location Update

Figure 3:
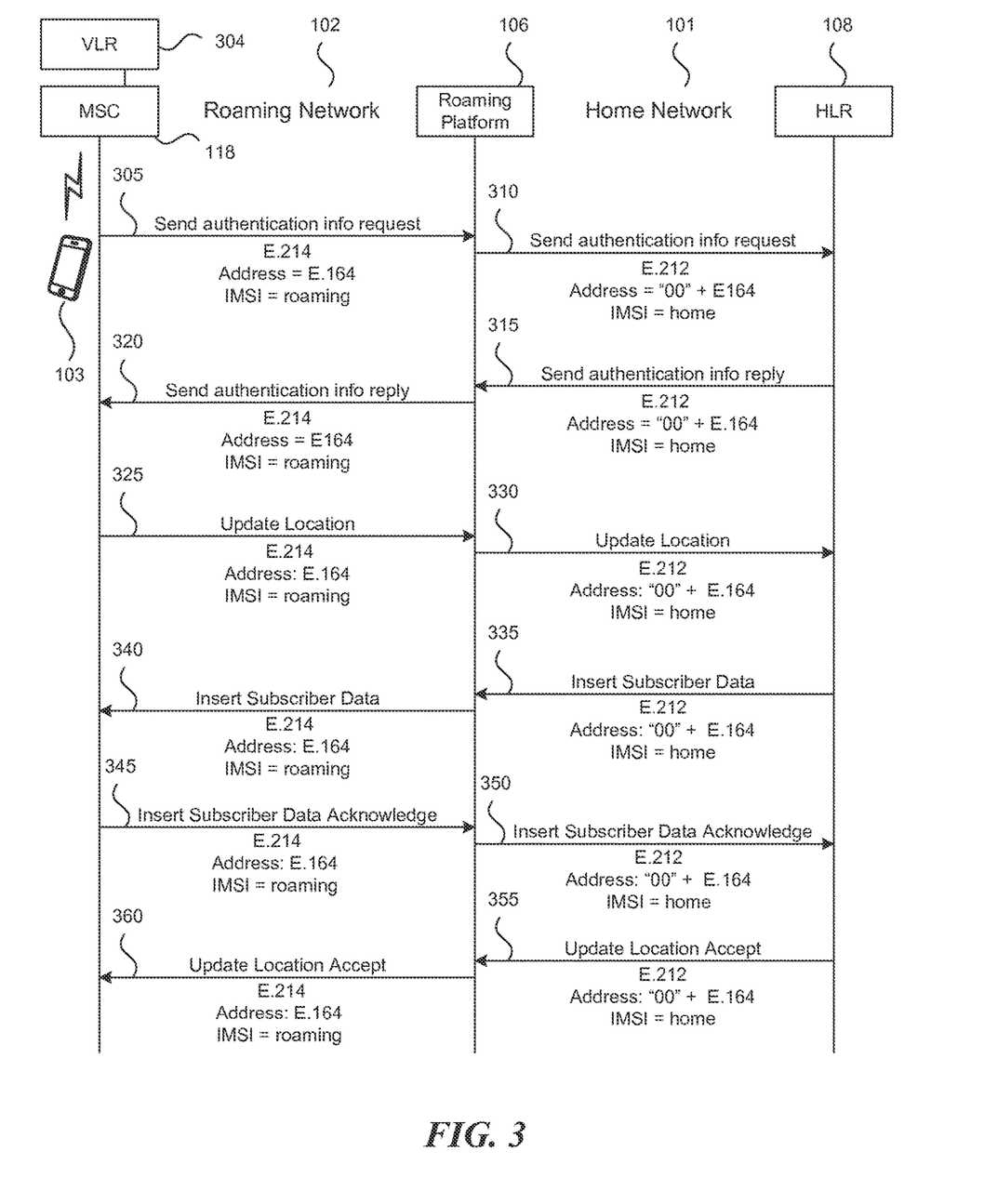
FIG. 3 is a sequence diagram illustrating communications between various components of the disclosed technology that may be utilized to handle the location update for a mobile device, which may be used in terminating MMS.

FIG. 3 is a sequence diagram illustrating communications between various components of the disclosed technology that may be utilized to handle a location update for a mobile device, which may be used in terminating MMS. As shown in FIG. 3, the sequence may include mobile device 103, MSC 118, visiting location register (VLR) 304, roaming network 102, home network 101, roaming platform 106, and HLR 108. One with ordinary skill in the art will appreciate that VLR 304 and MSC 118 can be communicably coupled (as shown in FIG. 3). Also, whether a MSC 118 or VLR 304 or a combination of is used in a location update process depends on how the MNO is setup. In this disclosure, as an example, MSC 118 and VLR 304 handle the location update. Also, VLR 304 maintains temporary mobile device user information to manage requests from customers who are out of the area covered by their home system. VLR 304 data is temporary data which exists for only as long as the customer is active in the particular area covered by the VLR 304. While one VLR is shown in FIG. 3, the system may include several VLRs.

As shown in FIG. 3, roaming platform 106 can behave like a virtual MSC/VLR. In some embodiments, roaming platform 106 passes messages, requests, replies, and responses back and forth between roaming network 102 and home network 101. For example, roaming platform 106 may add "00" to all messages and requests from roaming network 102 to home network 101 and remove "00" for all messages and requests from home network 101 to roaming network 102. The "00" prefix may be included at both Signaling Connection Control Part (SCCP) and Message Application Part (MAP) layers of communications between components of roaming network 102 and home network 101. Also, although roaming platform 106 as shown in FIG. 3 is separate from home network 101 and roaming network 102, one with ordinary skill in the art will appreciate that roaming platform 106 can communicate with several networks and be located in several networks. For example, roaming platform 106 can communicate with and be located in home network 101, roaming network 102, a General Packet Radio Service Roaming Exchange (GRX) network, or a combination of these networks.

As shown in FIG. 3 as part of the location update, mobile device 103 may first perform an authentication sequence. For example, as shown by arrow 305, VLR 304 may send an authentication information request using IMSI "roaming" (e.g., IMSI-2 or "IMSI-roaming") in an E.214 communication to roaming platform 106. The location request is sent using IMSI-2 because mobile device 103 is in roaming network 102. Also, for example, included in the authentication information request may be a visited MSC E.164 address. (E.164 address is a standard Global Title address, but one with ordinary skill in the art will appreciate the use of other node addresses.) In some embodiments, the authentication request can be handled with Signaling System number 7 (SS7) protocol and networks. One with ordinary skill in the art will appreciate that session initiation protocol (SIP) may be used in addition to or in place of SS7.

Once the E.214 message arrives at roaming platform 106, roaming platform 106 appends the E.164 address to include additional information, as shown by arrow 310. For example, roaming platform 106 may append the visited MSC E.164 to include "00" as a prefix. In some embodiments, the "00" represents that mobile device 103 is on roaming network 102 and/or using roaming platform 106 to communicate with home network 101. In some embodiments, the "00" prefix may represent that mobile device 103 has a virtual VLR/MSC (i.e., roaming platform 106). One with ordinary skill in the art will appreciate that different digits or appendages can be added to the E.164 address, and that digits or appendages can be placed in the middle, a prefix, suffix, or combination. Roaming platform 106 may also change the E.214 authentication request to an E.212 authentication request, if for example, roaming network 102 where E.214 is used in Europe and home network 101 where E.212 is used in the U.S.

As shown by arrow 310, roaming platform 106 may communicate with HLR 108. For example, in some embodiments, roaming platform 106 sends HLR 108 the authentication request using IMSI-1 and visited MSC E.164 address with a "00" prefix. When HLR 108 receives the authentication request, HLR 108 sees the "00" prefix and knows that authentication request is coming from roaming platform 106, which behaves like a virtual MSC/VLR. Also, in some embodiments, HLR 108 knows that "00" indicates mobile device 103 is on roaming network 106.

In some embodiments, as shown by arrow 315, HLR 108 responds to the authentication request with an authentication reply that contains information to verify mobile device 103 is registered to use the service. Then, as shown by arrow 320, roaming platform 106 may convert the authentication reply from E.212 to E.214 and switch IMSI-1 to IMSI-2 in the communication, and then roaming platform 106 may send the authentication reply to VLR 304 as shown by arrow 315. Here, the communications (e.g., the authentication reply) is over IMSI-2 and E.214, and may not contain the "00" prefix. In some embodiments, VLR 304 sends the authentication reply to mobile device 103 (not shown). Authentication requests and replies may be used to verify level of coverage (e.g., MMS) between a roaming mobile device and a home network.

Once authentication is complete, mobile device 103 can begin the location update process. Similar to the authentication process described above, VLR 304 communicates with roaming platform 106 (as shown by arrow 325), and roaming platform 106 appends the E.164 address to include the prefix "00" and converts E.214 messages to E.212 messages (as shown by arrow 330). Then, HLR 108 responds back to the update location message with an Insert Subscriber (ISD) message and sends the message with ISD to roaming platform 106 (as shown by arrow 335). ISD is primarily used by the home MNO to update the roaming network 102 when there is either a change in a subscriber parameter (e.g., MMS or SMS subscription or location). As shown by arrow 340, roaming platform 106 embeds the incoming ISD message and removes the "00" prefix, and roaming platform 106 communicates the ISD message to VLR 304 by switching back to an IMSI roaming and E.214 communication. One with ordinary skill in the art will appreciate that ISD messages can include other information regarding services mobile device 103 has access to such as voice services and other data services.

Then, as shown by arrows 345 and 350, VLR 304, via roaming platform 106, sends an ISD acknowledgement to HLR 108, which responds with a update location accept (as shown by arrow 355). Roaming platform 106 removes and adds the "00" prefix and switches between IMSI roaming and IMSI home, and switches between E.212 and E.214 (arrow 360).

Figure 4:
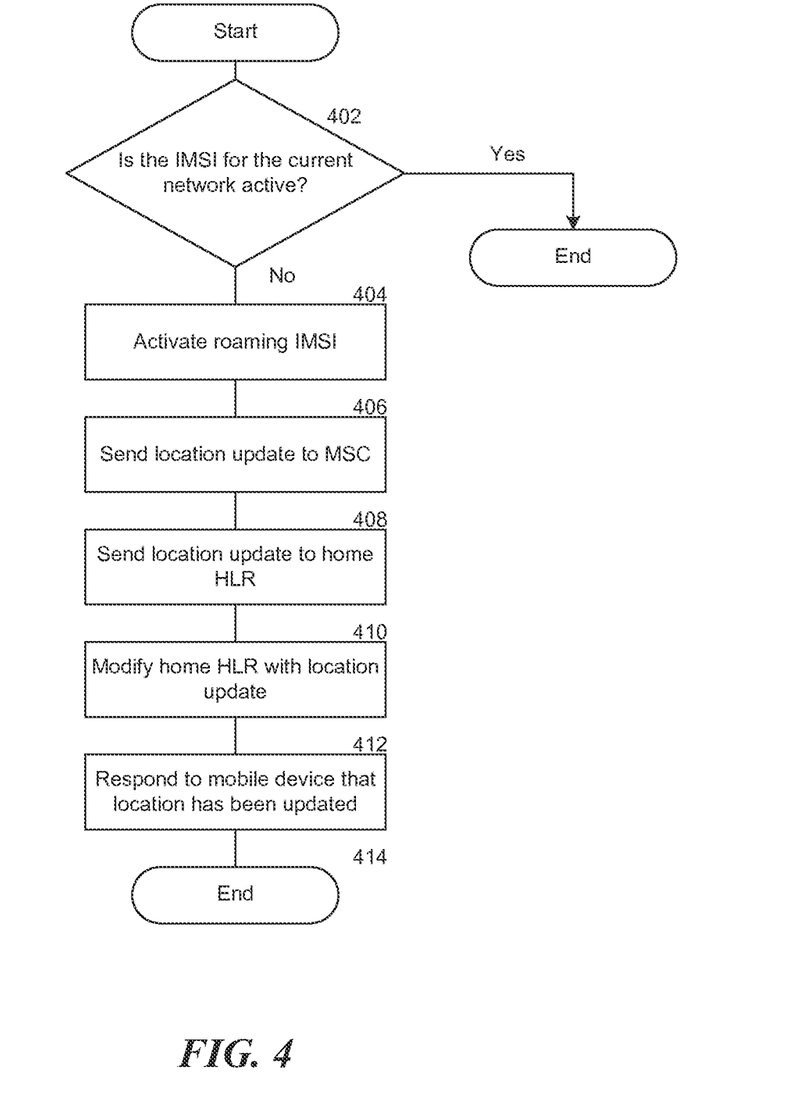
FIG. 4 is a flowchart illustrating an example of a set of operations for updating the location of a mobile device on a roaming network.

FIG. 4 is a flowchart illustrating an example of a set of operations for handling a location update for a mobile device. This set of operations for handling a location update may occur periodically (e.g., every minute, every hour, every day), on command (e.g., the network requests a location update or the user manually requests to update the mobile device location), upon detection of a triggering event, or before a call or message is sent from a mobile device. Moreover, one with ordinary skill in the art will appreciate that updating a location of a mobile device can happen at other times.

As illustrated in FIG. 4, decision operation 402 determines if the IMSI for the current network is active. For example, if a mobile device is on the home network and home IMSI-1 is active, the current IMSI is active. If a mobile device is in a roaming network and the home IMSI-1 is active, then the IMSI for the current network is not active. Rather, the roaming IMSI-2 should be active.

In accordance with some embodiments, mobile device 103 and roaming platform 106 may use various protocols (e.g., Location Update or Mobile Location Tracker) to determine if the mobile device is on home network 101 or roaming network 102. If a determination is made that a subscriber has no entry in the HLR of the roaming network, then the subscriber is not on a home network associated with mobile device 103. If the subscriber is not on the home network, the subscriber is roaming and the subscriber acquires an entry in a user database (e.g., VLR) of roaming network 102, and network services are enabled, assuming there is a roaming agreement in place.

If decision operation 402 determines that the IMSI for the current network is active, then decision operation 402 branches to end operation 404. If decision operation 402 determines that the IMSI for the current network is not active, the decision operation 402 branches to activation operation 406 where the corresponding IMSI on mobile device 103 is activated. For example, mobile device 103 may have a SIM card with two IMSIs, one IMSI-1 (e.g., home IMSI-1) for the home network and one IMSI-2 (e.g., roaming IMSI-2) for the roaming network. In this example, mobile device 103 can switch to IMSI-2 when a determination is made that mobile device 103 is roaming. Also, even though mobile device 103 has two IMSIs, mobile device 103 may have a single MSISDN that can be used to reach mobile device 103 even though the user is roaming.

During update operation 408, mobile device 103 can send a location update (LU) to the serving MSC 118. After the communication, serving MSC 118 will know the location of mobile device 103 and the location and address information may be updated in VLR 304. Next, VLR 304 may communicate the location update information to roaming platform 106.

During transmission operation 410, roaming platform 106 can transmit a location update to HLR 108. For example, as described in FIG. 3, roaming platform 106 interworks the logical address digits, which at least indicate the location of mobile device 103 on the roaming network, into a location update message that is routed to the HLR located on the home network associated with the home IMSI. In such example, the Signaling Connection Control Part (SCCP) calling address is changed from the MSC in the roaming network to a roaming platform 106 address (e.g., SYNI-VERSE dual-IMSI solution address). Also, the SCCP-called party address is changed from the roaming network IMSI-2 to the home IMSI-1 and sent via SCCP with the logical address digits (e.g., embedded numbers such as 156788890). In other words, roaming platform 106 is behaving like a virtual MSC/VLR.

At modification operation 412, after receiving location information from roaming platform 106, HLR 108 can modify the location of mobile device 103 in the corresponding HLR 108 database entry. For example, if the roaming platform sends location information for an IMSI associated with a subscriber, HLR 108 can look up that subscriber based on the IMSI and modify the entry for the subscriber to contain the location information (e.g., logical address digits). The roaming platform 106 communication (e.g., the received SCCP communication) may contain logical address digits that indicate mobile device's 103 location on the roaming network, and the HLR 108 adds these digits to HLR 108 database entry. The HLR may respond to roaming platform 106 with information about the subscriber stored in the HLR database on the home network (e.g., time, country, and operator). Furthermore, while not shown in the Figures, roaming platform 106 may first communicate with MMSC and then MMSC may communicate with HLR to relay the logical location of roaming mobile device 103.

At message operation 412, roaming platform 106 can embed incoming messages from the HLR into a response back to the roaming network. The incoming information is embedded into a message that is sent to the serving MSC/VLR (e.g., VLR 304). The serving MSC 118 responds back to mobile device 103 that update is complete. If the device is no longer roaming, roaming platform 106 can switch to home IMSI-1.

At operation end 414, assuming mobile device 103 via roaming platform 106 has not changed locations, the process ends. Mobile device 103 continues to use the IMSI that was activated until mobile device 103 via roaming platform 106 determines mobile device 103 has changed locations, and then decision operation 402 may be repeated (not shown).

Tables 1 and 2 below provide an example of a modified HLR entry from the operations for handling a location update for a mobile device. Table 1 provides some examples of HLR entries for subscribers using mobile devices on the home network. Table 2 provides some examples of HLR entries being updated (or modified) with location information (e.g., logical location data) for subscribers using mobile devices leaving the home network to enter a roaming network. Tables 1 and 2 include an IMSI for each user, and the IMSI is the home IMSI (e.g., home IMSI or IMSI-1 or the IMSI associated with the home MVNO or MNO, which operates the HLR).

As shown in tables 1 and 2, when HLR 108 receives a location update, including address information, from roaming platform 106 (e.g., a location update with the prefix "00" as described above), HLR 108 can modify or add an appendage the corresponding IMSI entry in the HLR database. For example, HLR 108 can modify the entry for John Smith from an appendage of "000" to an appendage of "787" when HLR 108 receives address information "787" from a roaming platform. The 787 appendage indicates the roaming network location of mobile device 103. While the appendage can be the same as the prefix "00" received from roaming platform 106, one with ordinary skill in the art will appreciate that the prefix can be translate or modified into an appendage.

Once the appendage is added or modified, if HLR 108 is queried, HLR 108 can determine from the appendage where mobile device 103 is roaming. For example, if MMSC 110 queries HLR 108 for the location of mobile device 103, HLR 108 may send a response to MMSC 110 with the location based on the appendage.

TABLE 1

| Subscriber | Appendage | IMSI |
| --- | --- | --- |
| John Doe | 000 | 404685505601234 |
| Jane Doe | 000 | 310150123456789 |
| John Smith | 000 | 4600013511078690 |

TABLE 2

| Subscriber | Appendage | IMSI |
| --- | --- | --- |
| John Doe | 141 | 404685505601234 |
| Jane Doe | 222 | 310150123456789 |
| John Smith | 787 | 4600013511078690 |

As shown above from the tables, there is a relationship between the appendage, subscriber, and IMSI (e.g., for John Doe, Appendage 141 implies he is roaming in a certain network and a certain MSC is servicing him, and his IMSI is 404685505601234). HLRs store this information and relationship. For example, HLR 108 can store an IMSI for each subscriber (e.g., John Smith) and an appendage (e.g., 787) as shown in tables 1 and 2. The appendage can be a single digit, multiple digits, a letter, letters, a symbol, symbols, or a combination. An administrator of an HLR 108 may adjust or decide what appendage to use by contacting the administrator of the roaming platform. Also, the appendage can be sent in an SRI_SM message from HLR 108 to MMSC 110 that queried HLR 108. Once MMSC 110 receives the SRI_SM message with an appendage, MMSC 110 will know to send an MMS message to MMSC 112 located in a roaming network based on the appendage.

Figure 5:
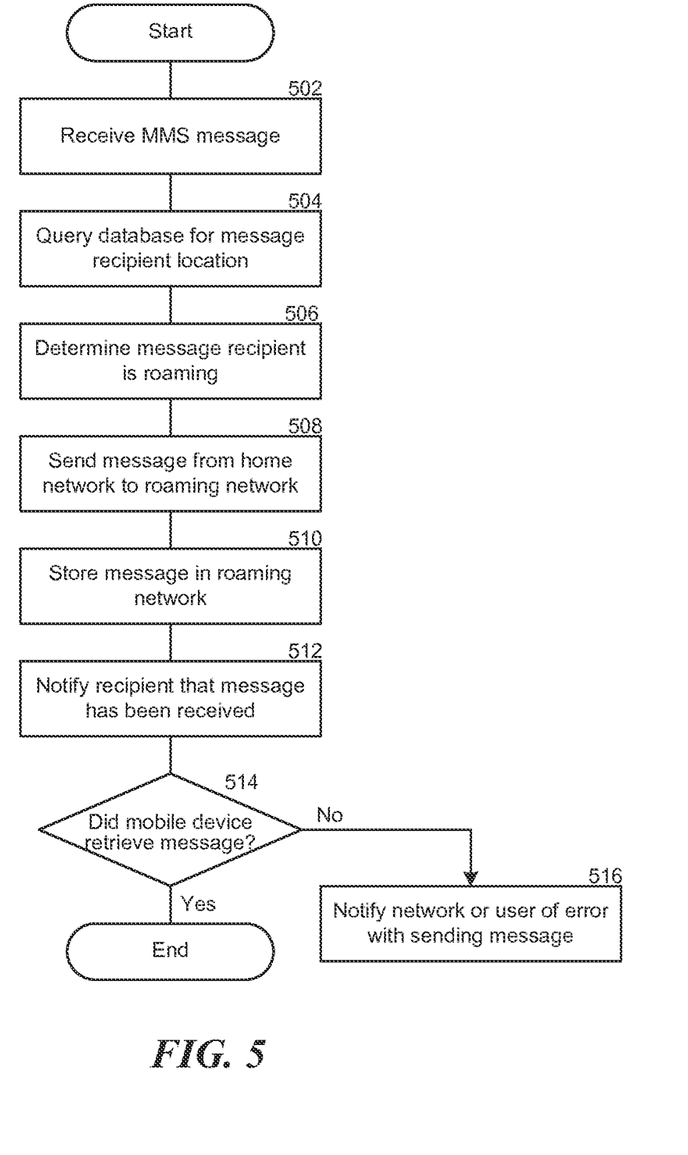
FIG. 5 is a flowchart illustrating an example of a set of operations for terminating MMS to a mobile device on a roaming network.

FIG. 5 is a flowchart illustrating an example of set of operations for terminating MMS to a mobile device on a roaming network. In some embodiments, these operations can be used to send an MMS message or multiple MMS messages to a mobile device or mobile devices on a roaming network after a location update has occurred in an HLR indicating that the mobile device is roaming. In accordance with some embodiments, the HLR entry can indicate that the user is outside the home network and in a roaming network, and that the IMSI has been switched to another roaming IMSI.

During receiving operation 502, MMSC 110 in home network 101 can receive an MMS message. For example, MMSC 110 may receive a photo that is intended to be delivered to mobile device 103 on roaming network 102. MMSC 110 performs a service level agreement (SLA) and database lookup for the sender of the MMS message to verify MMSC 110 can offer this MMS service. If the SLA check is okay (i.e., the mobile device sending the message has paid for the wireless service), then MMSC 110 may continue querying HLR 108. If the check is not okay, an error message may be sent back to the device that sent the message (e.g., a standard MM1 response).

At querying operation 504, MMSC 110 can query HLR 108 to determine where the MMS message recipient is located. For example, MMSC 110 may query HLR 108 to determine where mobile device 103 user is located because the message is addressed to mobile device 103. To query HLR 108, MMSC 110 can perform an SRI_SM to HLR 108 to determine if the subscriber is roaming. During the query, HLR 108 may determine that the address digits associated with the mobile device user indicate the user is roaming on a specific network. If HLR 108 determines that, based on the address digits, the recipient mobile device is roaming in roaming network 102, then MMSC 110 may communicate with MMSC 112.

Some parts of query operation 504 may be performed on MMSC 110. For example, MMSC 110 may contain an operator table that includes only user information for mobile devices that are set up with a roaming platform. If MMSC 110 looks up a message recipient and determines based on operator ID that the subscriber has a mobile device with a roaming platform, MMSC 110 may communicate with HLR 108 to determine the location of the mobile device.

While not shown in FIG. 5, MMSC 110 can determine if mobile device 103 is blacklisted from using or not allowed to use services (e.g., MMS). For example, similar to Tables 1 and 2, HLR 108 can store information in an IMSI entry that shows a mobile device 103 is not allowed to use MMS in a specific network or group of networks. Then, HLR 108 may respond back to the composer of the MMS message that mobile device 103 cannot receive MMS or there is an error.

At determination operation 506, MMSC 110 may determine whether the message recipient is roaming. For example, MMSC 110 may send an MM7 submit request to the roaming network 102 provider (e.g., an MVNO) that is directed to MMSC 112 (the MMSC for the roaming network 102).

At transmission operation 508, MMSC 110 sends a message from home network to roaming network. For example, MMSC 110 may communicate with MMSC 112 using standard protocols. MMSC 110 can then send the message to MMSC 112. At storing operation 510, MMSC 112 receives the MMS message from MMSC 110 and stores the message on the roaming network. The message is now available to be sent to a recipient. Notice that while this example involves one MMS message, several messages (the same or different) can be distributed to several users using this process.

At notification operation 512, serving MMSC 112 may perform a standard message sending process in a locally broken-out data session. For example, once MMSC 112 gets the message, MMSC 112 then stores the MMS message and triggers SMSC 114 to send a notification SMS message to mobile device 103. The notification SMS message contains an embedded URL where the message is stored by MMSC 112. This embedded URL is one that is generated by MMSC 112 and is local to MMSC 112.

At decision operation 514, MMSC 112 and SMSC 114 can determine if mobile device 103 has retrieved the message. For example, MMSC 112 may use network defined protocols (e.g., MM1/2/3/4) to determine if mobile device 103 has retrieved the message from MMSC 112. If decision operation 514 determines that mobile device 103 has retrieved the MMS message, the delivery is complete and decision operation 514 branches to termination operation 516 where the data session is terminated. However, if decision operation 514 determines that the MMS message has not been delivered, then decision operation 514 can branch to notification operation 516 where the MMSC 112 can notify the roaming network 102 (e.g., MSC 118) and/or mobile device 103 that an error has occurred and that mobile device 103 has not received the MMS message.

Terminating MMS

Figure 6:
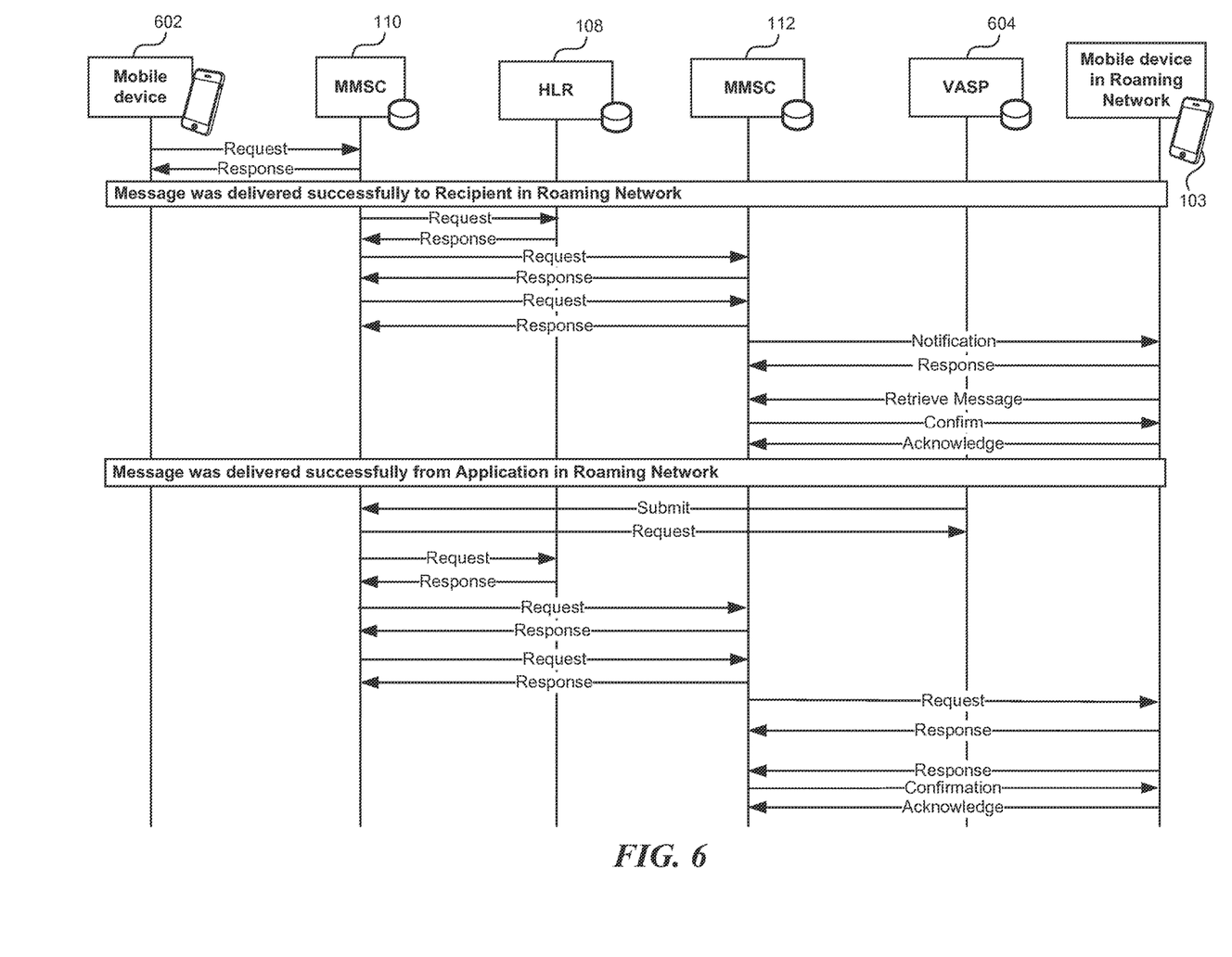
FIG. 6 illustrates an example of a sequence diagram illustrating message flow between various components that may be used in the disclosed technology.

FIG. 6 illustrates an example of a sequence diagram for a message flow between various components that may be used in the disclosed technology. For example, sending an MMS message from a mobile device 602 in home network 101 to mobile device 103 in roaming network 102. The vertical lines represent a hardware device (e.g., mobile device 103) and the corresponding software components (e.g., roaming platforms or protocols for sending messages). The horizontal lines and arrows represent communication (e.g., requests, responses, confirmation and acknowledgments) between different hardware components (e.g., mobile device 103 sending a request to the serving MMSC).

As shown in FIG. 6, mobile device 602 (e.g., any mobile device on the home network 101, which is different from mobile device 103) sends a request to MMSC 110 to send a multimedia message to a recipient (e.g., send a request via MM1/2/3/4 or other standard protocols). In response, MMSC 110 checks a service level agreement (SLA), which determines if the sending device is approved for sending messages, and also performs a database lookup to determine where to send the MMS message (e.g., message recipient information). As shown in FIG. 6, there is a request and response between mobile device 602 and MMSC 110. (While not shown, there can be other components involved like an MSC and BTS.)

Next, MMSC 110 can query HLR 108 to determine where to send the MMS message by sending a request (e.g., an SRI_SM request) to the HLR. For example, this is a custom request using the MM5 interface and SRI_SM request. Due to the location update procedure explained above, the HLR contains the serving MSC 118 address (e.g., the logical address digits) in the HLR database and responds back with that address in the SRI_SM response to MMSC 110. If the subscriber is not roaming, MMSC 110 may receive a response based on the address digits indicating the subscriber is on the home network or there is an error. In some embodiments, a MSC or VLR in the serving network sends an E.164 address with prefix digits to the home network, the custom MM5 interface in the home network detects the prefix digits in the E.164 address. Then, if a message arrives in the home network, the custom MM5 interface triggers a query in the home MMSC, the home MMSC identifies the mobile device as roaming, and the home MMSC forwards the MMS message to the serving MMSC via standard MM7 protocol for final delivery of the message to the roaming mobile device 103.

Next, if the recipient subscriber is roaming, MMSC 110 communicates with MMSC 112. For example, the standard MMSC handling of a terminating message is suspended upon receiving a specific address that belongs to a roaming network. MMSC 110 uses the MM7 interface to send terminating messages over the home network to the roaming network. In contrast, if the message recipient is not roaming, then MMSC 110 delivers the message locally on the home network.

Once MMSC 112 receives the message, MMSC 112 then stores the MMS message and triggers SMSC 114 (not shown in FIG. 6, but shown in FIG. 1) to send a notification SMS message to the roaming user. This follows the standard MMS processing. The notification SMS message contains an embedded URL pointing to where the message is stored by the serving network's MMSC (e.g., MMSC 112). This embedded URL is one that is generated by the serving MNO's MMSC and is local to that MMSC (e.g., MMSC 112). In some embodiments, mobile device 103 then uses the embedded URL to fetch the MMS message from MMSC 112 using an existing data connection, which is anchored on the serving network's GGSN 116 (i.e., locally broken out data session).

Also shown in FIG. 6 is a multimedia message delivered successfully from an application in a roaming network. For example, a value-added services provider (VASP) 604 may include applications that require MMS. M(V)NOs or a third party supply the VASP. Similar to the response and request method flow described above, VASP MMS messages can successfully be delivered from an application on a roaming network.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily only to the system described above. The elements and acts of the various examples described above can be combined to provide further implementations of the technology. While some alternative implementations of the technology may include additional elements to those implementations noted above, others may include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for delivering a multimedia message from a home communications network to a roaming communications network, the method comprising:
   receiving location data for a mobile device,
      wherein the mobile device is assigned a single unique Mobile Station International Subscriber Directory Number (MSISDN),
      wherein the mobile device includes at least two international mobile subscriber identities (IMSIs),
         wherein a first IMSI included in the mobile device is associated with the home communications network,
         wherein a second IMSI included in the mobile device is associated with the roaming communications network, and
      wherein each of the at least two IMSIs is associated with the single unique MSISDN assigned to the mobile device;
   receiving a multimedia message in the home communications network intended for delivery to the mobile device;
   determining that the mobile device is on the roaming communications network at least in part by querying a Home Local Register (HLR) on the home communications network;
   determining a level of coverage comprising information about at least a type of communication permitted between the mobile device and the home communications network;
   upon determining that the mobile device is on the roaming communications network:
      suspending delivery of the multimedia message using the home communications network; and
      upon suspending the delivery of the multimedia message using the home communications network, delivering the multimedia message to the mobile device using a multimedia service center (MMSC) in the roaming communications network for delivery using a local data session anchored in the roaming communications network based on an address of the MMSC and the level of coverage, and utilizing a Gateway GPRS Support Node (GGSN) and a Serving GPRS Support Node (SGSN) of the roaming communications network,
         wherein the local data session is executed by the MMSC in the roaming communications network.

2. The method of claim 1, wherein the location data of the mobile device is received from a roaming platform capable of adding and removing an appendage from communications between the home communications network and the roaming communications network, and wherein the appendage comprises digits that at least partially indicate the MMSC address.

3. The method of claim 1, further comprising:
   updating the HLR associated with the home communications network with the received logical location data for the mobile device,
      wherein updating the HLR includes modifying an HLR entry associated with the first IMSI on the home communications network,
      wherein modifying the HLR entry includes modifying the HLR entry to indicate the mobile device is on the roaming network, and
      wherein modifying the HLR entry includes adding address digits to the second IMSI, wherein the added digits extend a length of the second IMSI beyond a
standard length of the second IMSI.

4. The method of claim 1, wherein the second IMSI is associated with a mobile network operator network (MVNO).

5. The method of claim 4, further comprising: before determining that the mobile device is on the roaming communications network at least in part by querying the HLR, performing a search in a MMSC in the home communications network to determine if the multimedia message recipient is a mobile device capable of roaming.

6. The method of claim 1, wherein the mobile device has a third IMSI associated with another roaming communications network.

7. At least one non-transitory computer-readable medium, carrying instructions, which when performed by at least one data processor, perform operations for delivering a multimedia message from a home communications network to a roaming communications network, the operations comprising:
  identifying a string of digits that has been added to the address data for a mobile device,
    wherein the mobile device is assigned a single unique Mobile Station International Subscriber Directory Number (MSISDN),
    wherein the mobile device is on the roaming communications network,
    wherein the mobile device includes a first international mobile subscriber identity (IMSI) associated with the home communications network,
    wherein the mobile device includes a second IMSI associated with the roaming communications network,
    wherein the first IMSI and the second IMSI are both associated with the single unique MSISDN assigned to the mobile device, and
    wherein the string of digits is a prefix to the second IMSI associated with the roaming communications network;
  receiving a multimedia message in the home communications network intended for delivery to the mobile device,
  determining that the mobile device is on the roaming communications network at least in part by querying a Home Local Register (HLR) on the home communications network;
  determining a level of coverage between the mobile device and the home communications network,
    wherein the level of coverage comprises information about at least a type of communication permitted between the mobile device and the home communications network; and
  determining a level of coverage comprising information about at least a type of communication permitted between the mobile device and the home communications network;
  upon determining that the mobile device is on the roaming communications network:
    suspending delivery of the multimedia message using the home communications network; and
    upon suspending the delivery of the multimedia message using the home communications network, delivering the multimedia message to the mobile device using a multimedia service center (MMSC) in the roaming communications network for delivery using a local data session anchored in the roaming communications network based on an address of the MMSC and the level of coverage, and utilizing a Gateway GPRS Support Node (GGSN) and a Serving GPRS Support Node (SGSN) of the roaming communications network,
    wherein the local data session is executed by the MMSC in the roaming communications network.

8. The computer-readable medium of claim 7, wherein the string of digits that has been added to the address data for the mobile device is a prefix.

9. The computer-readable medium of claim 8, wherein the prefix appears in the signaling connection control part (SCCP) and Message Application Part (MAP) layers.

10. The computer-readable medium of claim 7, wherein the operations further comprise:
  updating the HLR associated with the home communications network with the received logical location data for the mobile device,
    wherein updating the HLR includes modifying an HLR entry associated with the first IMSI on the home communications network,
    wherein modifying the HLR entry includes modifying the HLR entry to indicate the mobile device is on the roaming network, and
    wherein modifying the HLR entry also includes the HLR communicating the modification to a call detail record (CDR) generating entity.

11. The computer-readable medium of claim 7, wherein the operations further comprise verifying that the mobile device is not blacklisted from multimedia message service (MMS) in part by querying the modified HLR entry.

12. The computer-readable medium of claim 7, wherein the operations further comprise, before determining that the mobile device is on the roaming communications network at least in part by querying the HLR, determining that the mobile device is capable of MMS at least in part by querying a multimedia service center (MMSC).

13. A computer-readable medium, excluding transitory signals, having stored thereon instructions that when executed by one or more processors cause a machine to:
  receive location data for a mobile device indicating that the mobile device is on a roaming communications network,
    wherein the mobile device is assigned a single unique Mobile Station International Subscriber Directory Number (MSISDN),
    wherein the mobile device includes multiple international mobile subscriber identities (IMSI) including a home IMSI associated with a home communications network and a roaming IMSI associated with a roaming communications network, and
    wherein each of the multiple IMSIs is associated with the single unique MSISDN;
  receive a multimedia message in the home communications network intended for delivery to the mobile device;
  determine that the mobile device is on the roaming communications network at least in part by querying a Home Local Register (HLR) on the home communications network;
  determine a level of coverage between the mobile device and the home communications network,
    wherein the level of coverage comprises information about at least a type of communication permitted between the mobile device and the home communications network; and determining a level of coverage comprising information about at least a type of communication permitted between the mobile device and the home communications network;
upon determining that the mobile device is on the roaming communications network:
suspending delivery of the multimedia message using the home communications network; and
upon suspending the delivery of the multimedia message using the home communications network, delivering the multimedia message to the mobile device using a multimedia service center (MMSC) in the roaming communications network for delivery using a local data session anchored in the roaming communications network based on an address of the MMSC and the level of coverage, and utilizing a Gateway GPRS Support Node (GGSN) and a Serving GPRS Support Node (SGSN) of the roaming communications network,
wherein the local data session is executed by the MMSC in the roaming communications network.

14. The computer-readable medium of claim 13, wherein the instructions when executed by the one or more processors further cause the machine to verify that the mobile device is not blacklisted from multimedia message service (MMS) in part by querying the MMSC on the home communications network and accessing the modified HLR entry.

15. The computer-readable medium of claim 13, wherein the instructions when executed by the one or more processors further cause the machine to:
update the HLR associated with the home communications network with the received logical location data for the mobile device,
wherein updating the HLR includes modifying an HLR entry associated with the first IMSI on the home communications network,
wherein modifying the HLR entry includes modifying the HLR entry to indicate the mobile device is on the roaming network, and
wherein modifying the HLR entry includes adding digits to the HLR entry to indicate that the mobile device is on the roaming network, and wherein the digits at least partially indicate the address of the MMSC on the roaming network.

16. The computer-readable medium of claim 13, wherein the instructions when executed by the one or more processors further cause the machine to create the local data session in the roaming network without further communication from the home communications network.

17. The computer-readable medium of claim 13, wherein to determine that the mobile device is on the roaming communications network at least in part by querying the HLR on the home communications network includes sending a Send Routing Information (SRI) message using Message Application Part (MAP) protocol.

18. A system for delivering a multimedia message from a home communications network to a roaming communications network, the system comprising:
a processor;
a communications port;
a non-transitory computer-readable medium storing instructions that, when executed by the processor, cause a multimedia message center (MMSC) in the home communications network to:
receive and store a multimedia message intended for a recipient;
determine if the intended recipient of the multimedia message is a mobile device subscriber configured to communicate with a roaming platform,
wherein the mobile device is assigned a single unique Mobile Station International Subscriber Directory Number (MSISDN),
wherein the mobile device includes at least two international mobile subscriber identities (IMSIs),
wherein a first IMSI included in the mobile device is associated with the home communications network,
wherein a second IMSI included in the mobile device is associated with the roaming communications network, and
wherein each of the at least two IMSIs is associated with the single unique MSISDN assigned to the mobile device;
when the intended recipient of the multimedia message is a mobile device subscriber configured to communicate with a roaming platform, query a home local register (HLR) via an interface in response to receiving the multimedia message intended for a recipient;
receive from the HLR, via the communications port, the serving MMSC location information;
determine a level of coverage comprising information about at least a type of communication permitted between the mobile device and the home communications network;
upon determining that the intended recipient of the multimedia message is configured to communicate with the roaming platform:
suspend delivery of the multimedia message using the home communications network; and
upon suspending the delivery of the multimedia message using the home communications network, deliver the multimedia message to the mobile device using a serving MMSC in the roaming communications network for delivery using a local data session anchored in the roaming communications network based on the level of coverage, and utilizing a Gateway GPRS Support Node (GGSN) and a Serving GPRS Support Node (SGSN) of the roaming communications network.

19. The system of claim 18, wherein the interface is a modified MM5 interface or a modified MM7 interface configured to send-routing-information for short message (SRI_SM) requests to the HLR to determine a location for the intended recipient of the multimedia message.

20. The system of claim 18, wherein an administrator of the system for delivering can disable the query of the home local register (HLR) via an interface in response to receiving the multimedia message intended for a recipient.

* * * * *